United States Patent
Anspach

(10) Patent No.: US 12,358,585 B2
(45) Date of Patent: Jul. 15, 2025

(54) SEAT POST CLAMP

(71) Applicant: SDG Components Inc., Huntington Beach, CA (US)

(72) Inventor: Tyler Anspach, Huntington Beach, CA (US)

( * ) Notice: Subject to any disclaimer, the term of this patent is extended or adjusted under 35 U.S.C. 154(b) by 267 days.

(21) Appl. No.: 18/138,741

(22) Filed: Apr. 25, 2023

(65) Prior Publication Data
US 2024/0359758 A1    Oct. 31, 2024

(51) Int. Cl.
*B62J 1/08*    (2006.01)

(52) U.S. Cl.
CPC ........................................ *B62J 1/08* (2013.01)

(58) Field of Classification Search
CPC ........................................................... B62J 1/08
See application file for complete search history.

(56) References Cited

U.S. PATENT DOCUMENTS

| | | | | |
|---|---|---|---|---|
| 5,501,506 A * | 3/1996 | Kao | ........................... | B62J 1/08 297/215.15 |
| 5,649,738 A * | 7/1997 | Thomson | ................... | B62J 1/08 297/217.2 |
| 8,894,141 B2 * | 11/2014 | Tisue | ......................... | B62J 1/08 297/215.14 |
| 9,573,642 B2 * | 2/2017 | Liao | ........................... | B62J 1/02 |
| 9,783,254 B2 * | 10/2017 | Li | .............................. | B62J 1/08 |
| 10,179,622 B2 * | 1/2019 | Hermansen | ................ | B62J 1/08 |
| 10,370,051 B2 * | 8/2019 | Staples | ...................... | B62J 1/08 |
| 10,759,484 B2 * | 9/2020 | Chen | .......................... | B62J 1/08 |
| 10,780,933 B2 * | 9/2020 | Choltco-Devlin | ......... | B62J 1/08 |
| 11,661,129 B2 * | 5/2023 | Chambers | .................. | B62J 1/08 297/199 |
| 11,679,829 B1 * | 6/2023 | Miles | ......................... | B62J 1/06 297/215.14 |
| 11,780,520 B1 * | 10/2023 | Staples | ...................... | B62J 1/06 297/199 |
| 2007/0286671 A1 * | 12/2007 | Meggiolan | ................. | B62J 1/08 403/230 |
| 2012/0139207 A1 * | 6/2012 | Ferreira | ...................... | B62J 1/08 280/287 |
| 2015/0314821 A1 * | 11/2015 | Tisch | ...................... | B62K 19/40 403/220 |
| 2024/0076007 A1 * | 3/2024 | Winefordner | .............. | B62J 1/08 |

* cited by examiner

*Primary Examiner* — Philip F Gabler
(74) *Attorney, Agent, or Firm* — Shalchi Law PC; Ali Shalchi

(57) ABSTRACT

A seat post clamp for securing a bicycle seat to a bicycle frame, the seat post clamp having a clamp assembly, the clamp assembly having a central height axis and further comprising a cradle, a set of two identical wing clamps, a central base, and a set of two fasteners. The clamp assembly having a first configuration and second configuration, where the cradle is positioned below the bicycle seat, the central base is positioned below the cradle, the wing clamps are symmetrically disposed relative to the central height axis, the wing clamps and cradle are each configured to rigidly contact the central base in the first configuration and to slidably contact the central base in the second configuration, and wherein the fasteners are configured to provide both longitudinal and rotational adjustment of the attached bicycle seat in the second configuration.

9 Claims, 10 Drawing Sheets

SEAT POST CLAMP

FIELD OF THE INVENTION

This disclosure relates to the field of adjustable bicycle seats and seat clamps.

BACKGROUND

Modern bicycles come equipped with a number of adjustable components that serve various riding styles and preferences. A bicycle's seat adjustment in particular must be safely and easily done, preferably in the least amount of time. Typically, the seat, or saddle, sits atop a dual-post structure that is compressible for up and down motion via a hydraulic mechanism found within the posts, and controlled remotely at the handlebars. At the top of the upper post and directly underneath the saddle, a clamping assembly secures the seat, via its attached mounting rods, to the upper post and bicycle frame. This often serves as a point of weakness for a number of reasons.

Conventional clamp assemblies often include a plurality of clamp components, such as side, top and bottom, and other obliquely oriented clamps, as well as numerous fasteners, which all require more time to install onto the bicycle frame and saddle. While these options may be effective in locking the saddle into place and even providing various adjustment options when needed, the added components increase the size and weight of the assembly, create more possible points of failure, take longer to adjust, and can make adjustments more difficult-especially when the adjustment necessitates front access by the rider. Oftentimes, a rider will need to make adjustments more quickly, not only due to personal preference, but to varying rough terrain and other environmental conditions which require more speed in adapting to the new riding conditions. More importantly, it is desired that the assembled clamp components have a minimal vertical profile (i.e. "stack height") such that the saddle can sit lower relative to the bicycle at any given seat post position. A lower profile, more streamlined, and easily accessible clamp assembly is needed in the art.

SUMMARY

A seat post clamp is provided that has a minimized vertical profile (i.e. stack height) that allows the seat to sit lower relative to the bicycle at a given seat post height, and lower relative to the terminal end of the seat post.

In an exemplary embodiment, a seat post clamp for securing a bicycle seat to a bicycle frame comprises a clamp assembly having a cradle having central length, width, and height axes and further comprising a top region, a body, and a bottom region. The top region having a length and width, and further comprising lateral projections, the lateral projections protruding outwardly from the top region in opposing directions. The body further comprising two opposing lateral surfaces. The bottom region having a length and width, and further comprising guide rails, the guide rails protruding outwardly from the bottom region, wherein the bottom region length is shorter than the top region length, wherein the lateral projections and cradle guide rails extend along the cradle parallel to its width axis, wherein the lateral surfaces and lateral projections meet to form first channels, wherein a mating surface lies between the cradle guide rails. The clamp assembly further comprises a set of two wing clamps, each wing clamp having a depth and height, and comprising an inner surface concavity, each inner surface concavity terminating in a guide rail at a lower end and a second channel at an upper end, and a central base having a depth, width and height, and comprising a top region and two opposing sides. With the top region further comprising a mating surface with a depth, each side further comprising an arched guide rail, the arched guide rails having a depth and protruding outwardly from the sides and forming top portions of channels, the channels having a depth, and wherein the central base mating surface lies between the opposing sides. The clamp assembly further comprises a set of two fasteners, each fastener having a length, a central length axis, and a thickness running orthogonal to the length, and wherein the cradle and wing clamps are configured to accept the fasteners and releasably mate therewith, this mating simultaneously engaging the cradle and wing clamps with the central base, each wing clamp simultaneously flanking a lateral surface of the cradle and an arched guide rail of the central base, their inner surface concavities facing each other, each wing clamp further being the mirror image of the other and symmetrically disposed relative to an imaginary plane running parallel to and intersecting both the central height and width axes of the cradle, wherein the mated cradle and wing clamps are configurable into fixed and adjustable positions relative to the central base and each other, wherein the cradle, wing clamps, and central base are rigidly fixed together in the fixed position, and wherein the cradle and wing clamps are slidably engaged with the central base and loosely engaged with each other in the adjustable position.

In one aspect, the bicycle seat has a length terminating in front and back ends, and further comprises an underside with a set of mounting rods running parallel to the seat length, wherein the first and second channels are configured to slidably engage with the mounting rods, and wherein the central base channels are configured to slidably engage with the wing guide rails. In another aspect, the lateral projections have curved top and bottom surfaces, the first channels coinciding with these curved bottom surfaces, wherein the cradle lateral surfaces further include a set of two outer mating surfaces of the cradle guide rails, wherein the cradle guide rails further comprise a set of two inner guide surfaces opposing the set of outer mating surfaces, wherein the second channels of the wing clamps face the first channels of the cradle to form tubular channel tunnels, the mounting rods making slidable contact with both channels while running through said channel tunnels for longitudinal adjustment of the bicycle seat while the clamp assembly is in the adjustable position, and wherein the central base guide rails are depth-wise arched progressively higher from front to back, such that sliding the cradle and wing clamps along the central base channels results in vertical pivoting of the front and back ends of the bicycle seat for its rotational adjustment while the clamp assembly is in the adjustable position.

In a further aspect of the seat post clamp, the cradle mating surface slidably contacts the central base mating surface, wherein the inner surface concavities of the wing clamps slidably contact the central base guide rails while releasably contacting the outer mating surfaces of the cradle guide rails, and wherein the inner guide surfaces of the cradle guide rails also slidably contact the central base guide rails. In another aspect, the top region of the cradle further comprises a cavity with a length that is within 10% of the bottom region length, wherein the lateral projections each have a proximal and distal end, and wherein said proximal ends coincide with lengthwise boundary surfaces of the cavity. In another aspect, the lateral projections and first channels extend along the full top region width, wherein the cradle guide rails extend along the full bottom region width, wherein the second channels extend along the full depths of the wing clamps, and wherein the full depths of the central base mating surface and central base guide rails are each greater than that of the central base channels. In another aspect, the seat post the cradle further comprises a set of two tunnels running through its body, each tunnel having a length, a diameter, an opening in the cavity at one end and an opening in a lateral surface at the opposing end, the tunnels further having length axes that intersect at an imaginary point lying above the cradle, and wherein each wing clamp also comprises a tunnel with a length, diameter, and length axis, the wing tunnels and cradle tunnels having a shared length axis when the clamp assembly is releasably mated, the lengths of the fasteners running through both the wing and cradle tunnels and also sharing said length axis.

In another aspect of the seat post clamp, the cradle tunnel openings in the cavity are symmetrically disposed along the cradle's top region length relative to an imaginary plane running parallel to and intersecting both the central height and width axes of the cradle, and wherein the clamp assembly further comprises a set of two securing elements configured to nest within the cradle cavity and receive the fasteners through the cradle tunnels. In a further aspect, each securing element is aligned with one cradle tunnel opening, each securing element having a cylindrical body with length that exceeds any single dimension of its corresponding cradle tunnel opening, wherein each securing element further comprises a tunnel running through it orthogonal to its length, each tunnel having a diameter, length, and central length axis, and wherein the cradle tunnels, wing tunnels, securing element tunnels, and fasteners are tubular and threaded, the fasteners having a length greater than that of the cradle tunnels, wing tunnels, and securing element tunnels combined. In one aspect, each wing clamp has no more than one tunnel running through it to accept a fastener.

In another embodiment, a seat post clamp for securing a bicycle seat to a bicycle frame comprises a clamp assembly, the clamp assembly having a central height axis and further comprising a cradle, a set of two identical wing clamps, a central base, and a set of two fasteners. The clamp assembly having a first configuration and second configuration, where the cradle is positioned below the bicycle seat, the central base is positioned below the cradle, the wing clamps are symmetrically disposed relative to the central height axis, the wing clamps and cradle are each configured to rigidly contact the central base in the first configuration and to slidably contact the central base in the second configuration, and wherein the fasteners are configured to provide both longitudinal and rotational adjustment of the attached bicycle seat in the second configuration.

In one aspect, the cradle further comprises two opposing lateral surfaces and two guide rails, wherein each wing clamp has an inner surface concavity, wherein the central base has guide rails and channels, and wherein the fasteners run through both wing clamps and the cradle. In another aspect, each cradle guide rail has an inner and outer surface, and wherein the cradle has a primary and secondary length, the secondary length terminating in the opposing lateral surfaces, the lateral surfaces including the outer surfaces of the cradle guide rails. In a further aspect, the inner surface concavities of the wing clamps contact the outer surfaces of the cradle guide rails and the central base guide rails and channels, and wherein the inner surfaces of the cradle guide rails contact the central base guide rails.

In a further embodiment, a clamp assembly for adjustably securing mounting rods comprises a cradle, a set of two identical wing clamps, a central base, and a set of two fasteners. The fasteners can be manipulated to provide either a clamped configuration or adjustable configuration of the clamp assembly, wherein the clamped configuration simultaneously provides a primary clamping action and secondary clamping action, wherein the primary clamping action fixes the position of the mounting rods, wherein the secondary clamping action fixes the position of the cradle and wing clamps relative to the central base, wherein the adjustable configuration simultaneously provides a primary adjustment and secondary adjustment, wherein the primary adjustment allows sliding of the mounting rods, and wherein the secondary adjustment allows sliding of the cradle and wing clamps relative to the central base.

In one aspect, the clamp assembly is attached to a terminal end of an upper stanchion, the cradle and wing clamps are configured to rigidly contact the mounting rods via the primary clamping action, and to rigidly contact the central base via the secondary clamping action, the secondary clamping action applying vertical and horizontal clamping pressure upon the central base, and wherein the distance from the terminal end of the upper stanchion to the mounting rods is less than or equal to 20 mm. In another aspect, the mounting rods are attached to a bicycle seat having a length, front and back ends, and sides, wherein the clamp assembly is attached to a seat post of a bicycle frame, wherein the primary adjustment provides a longitudinal sliding motion of the bicycle seat parallel to its length, and wherein the secondary adjustment provides front to back pivoting of the bicycle seat relative to the seat post. In another aspect, the fasteners are disposed below the sides of the seat and adjustably accessible therefrom. In a further aspect, the fasteners are further disposed below the mounting rods, each fastener running through a wing clamp and the cradle. In another aspect, the cradle further comprises a cavity, wherein the fasteners have threaded portions, and wherein each fastener is further secured by a securing element on its threaded portion within the cradle cavity.

DETAILED DESCRIPTION

In the following discussion, numerous specific details are set forth to provide a thorough understanding of the disclosed subject matter. However, those skilled in the art will appreciate that the present disclosed subject matter may be practiced without such specific details. In other instances, well-known elements, processes or techniques have been briefly mentioned and not elaborated on in order not to obscure the disclosed subject matter in unnecessary detail and description. Moreover, specific details and the like may have been omitted inasmuch as such details are not deemed necessary to obtain a complete understanding of the disclosed subject matter, and are considered to be within the understanding of persons having ordinary skill in the relevant art.

The present invention is optimized for use with standard bicycles having a frame and attached seat, or saddle. It includes one or more assemblies of components which can be integrated with the bicycle frame in order to secure the seat to the frame.

Figure 1:
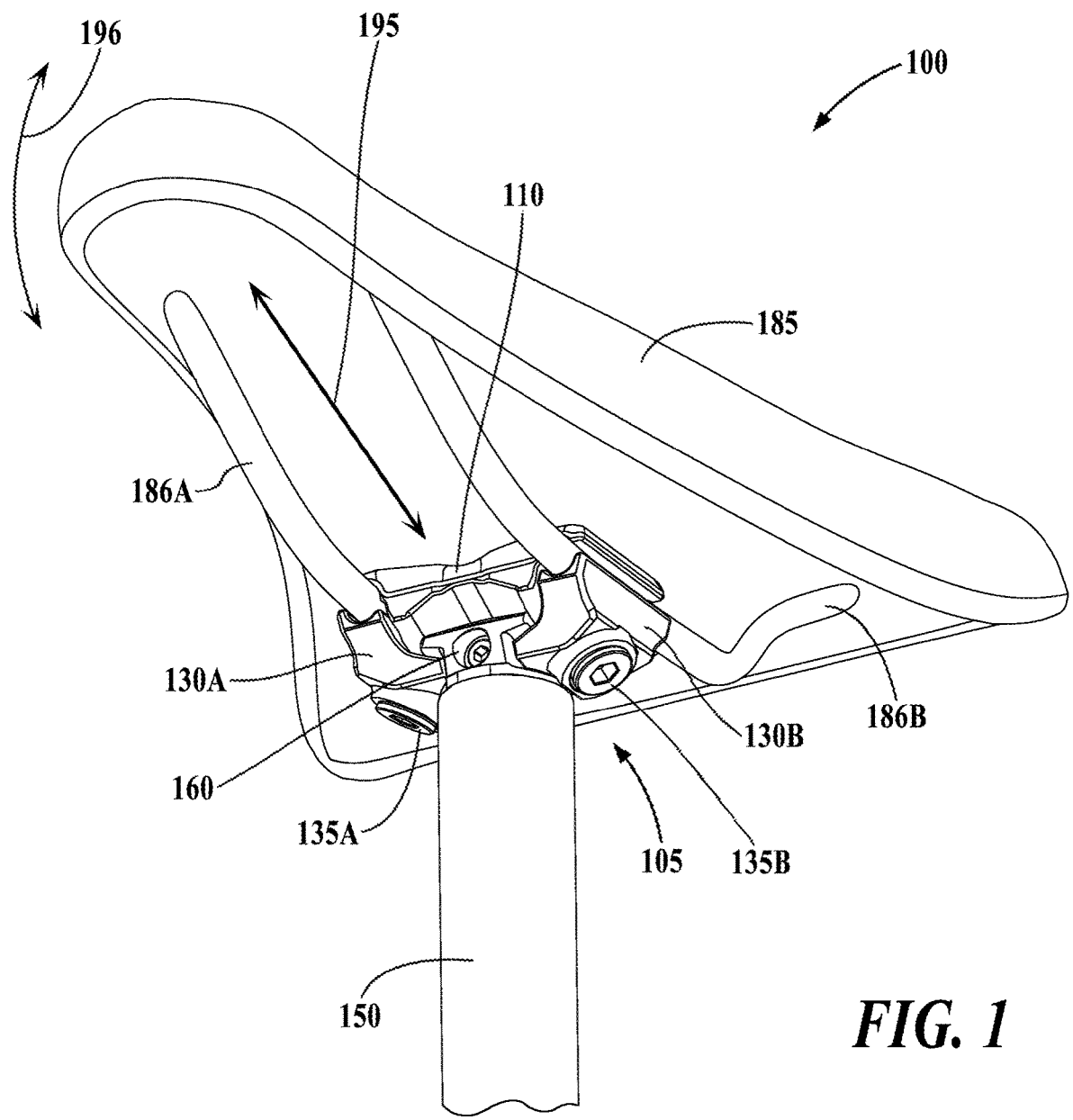
FIG. 1 is a bottom perspective view of a fully installed seat post clamp in an embodiment of the presently disclosed invention.

Referring to FIG. 1, an illustration shows a bottom perspective view of a seat post clamp 100 fully installed onto a bicycle seat, or saddle 185. The bicycle saddle 185 has a length terminating in front and back ends, and a width terminating in opposing sides. The saddle 185 further comprises an underside with a set of mounting rods 186 running parallel to the length of the saddle 185. A plane intersecting both the longitudinal and height axes of the saddle 185 provides a plane of symmetry for both mounting rods 186A and 186B, which are the mirror image of one another. The seat post clamp 100 provides a means for securing the saddle 185 to a bicycle frame. To that end, the seat post clamp 100 further comprises a clamp assembly 105 situated at the top (i.e. terminal end) of an upper stanchion 150 of a seat post extending upward from the bicycle frame, and attached thereto. The seat post clamp 100 is configured to minimize the distance from the terminal end of the upper stanchion 150 to the bottom of the mounting rods 186A and 186B (the portion of the mounting rods 186A and 186B held within the clamp assembly and contacted by the first channels 220 and second channels 240 of FIG. 2, see below) In an exemplary embodiment, this distance is less than or equal to 20 mm. The clamp assembly 105 further comprises a cradle 110, a set of two wing clamps 130A and 130B, a central base 160, and a set of two dual-adjustment fasteners 135A and 135B. The cradle 110 is positioned below the bicycle saddle 185, while the central base 160 is positioned below the cradle 110. The cradle 110 has a primary length dimension and secondary length dimension, along with width, and height dimensions, each having associated central axes. The primary length of the cradle 110 runs orthogonal to that of the installed saddle 185. In subsequent descriptions of size and associated dimensions, multiple instances of a dimension for a single component (such as a primary and secondary length of the cradle 110) are used to help further describe the varying contours and surfaces of the component, while assuming the primary instance measures the full length, for example, and successive instances (e.g. secondary, tertiary) run parallel to the primary.

The cradle 110 and wing clamps 130 accept the set of fasteners 135 and releasably mate via the engaging and disengaging of the fasteners 135. Each fastener 135 further has a length and central length axis, and a thickness running orthogonal to its length. In one embodiment, the fasteners 135 are threaded so that screwing and unscrewing them provides the above-mentioned releasability. This mating simultaneously engages the cradle 110 and wing clamps 130 with the central base 160. Each wing clamp 130 simultaneously flanks a lateral surface of the cradle 110 and an arched guide rail (see arched guide rails 362 of FIG. 3) of the central base 160, while also being disposed orthogonal to the length axis of the saddle 185. The wing clamps 130 each have inner surface concavities (see inner surface concavities 331 of FIG. 3) which face each other in this mated position, each wing clamp 130 being the mirror image of the other and symmetrically disposed relative to an imaginary plane running parallel to and intersecting both the central height and width axes of the cradle 110. The mated cradle 110 and wing clamps 130 are configurable into fixed and adjustable positions relative to the central base 160 and each other, such that the cradle 110, wing clamps 130, and central base 160 are rigidly fixed together in the fixed position, or first configuration of the clamp assembly 105, and such that the cradle 110 and wing clamps 130 are slidably engaged with the central base 160 and loosely engaged with each other in the adjustable position, or second configuration of the clamp assembly 105. This allows for longitudinal adjustment of the bicycle saddle 185 while the clamp assembly 105 is in the adjustable position, as indicated by double-sided motion arrow 195. As well, the second configuration provides for vertical pivoting of the front and back ends of the bicycle saddle 185 for its rotational adjustment while the clamp assembly 105 is in the adjustable position, as indicated by double-sided rotational arrow 196. The present invention further provides quick, unfettered side access to saddle adjustment, rather than front access. Installation is also accomplished more quickly via the side access and fewer components.

Thus, as shown and described, the clamp assembly 105 has a minimized vertical profile (i.e. stack height) which in turn allows the saddle 185 (and mounting rods 186A-B) to sit lower relative to the bicycle at a given saddle height (and relative to the terminal end of the upper stanchion 150).

Figure 2:
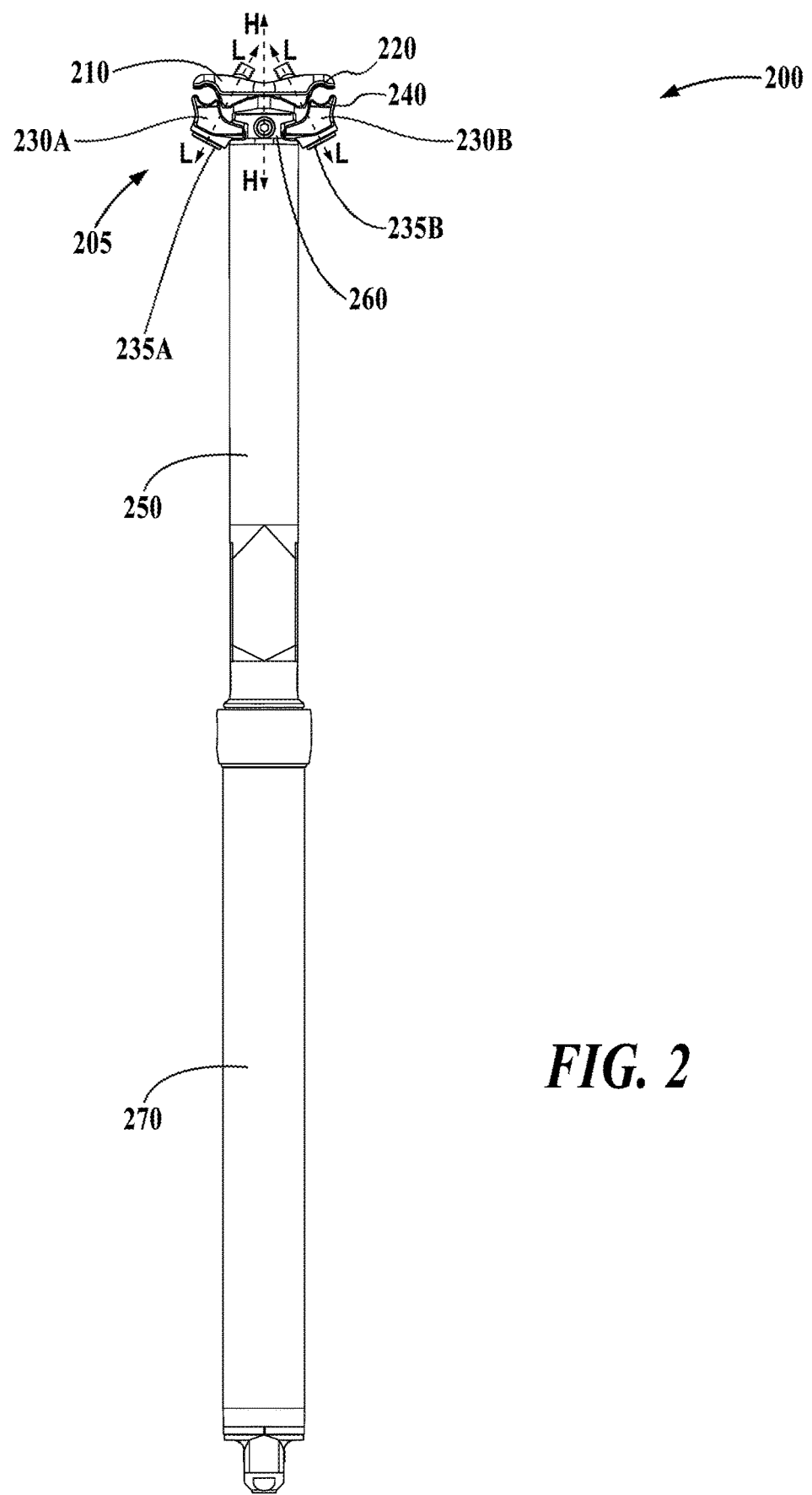
FIG. 2 is a front view of an entire isolated seat post clamp in an embodiment of the presently disclosed invention.

Referring to FIG. 2, an illustration shows a front view of an entire isolated seat post clamp 200 in an extended configuration. The seat post clamp 200 further comprises the clamp assembly 205, the upper stanchion 250 (partially shown in FIG. 1) and a lower stanchion 270 which is positioned below the upper stanchion 250. The stanchions 250 & 270 are concentrically mated post structures each having tubular forms. The lower stanchion 270 is insertable into a standard seat tube of a bicycle frame. The upper stanchion 250, having a smaller diameter than the lower stanchion 270, is compressibly inserted into the lower stanchion so that depression of a connected remote substantially lowers the upper stanchion with attached clamp assembly 205 when a rider's body weight is applied to the attached saddle (see saddle 185 of FIG. 1). The lowered upper stanchion 250 provides a collapsed configuration for the saddle and rider.

The frontal view of FIG. 2 better shows the spatial relationships between components found in the clamp assembly 205, which is shown having a central height axis H-H. The cradle 210 sits atop the central base 260, both of these elements being laterally flanked by the wing clamps 230A and 230B. The dual-adjustment fasteners 235A and 235B run through both wing clamps 230 and the cradle 210 and can be manipulated by a user to achieve various positions or configurations of the clamp assembly 105. The tightened fasteners 235 push the wing clamps 230 and cradle 210 toward each other at an angle vertically, which applies both vertical and horizontal clamping pressure upon the central base 260 to provide the fixed, or clamped position/configuration of the clamp assembly 205. The fasteners 235 are each shown with a central length axis L-L. Each central length axis L-L further coincides with the central length axes of tunnels found through the cradle 210, wing clamps 230, and securing elements (see securing elements 436 and securing element tunnels 438 of FIG. 4, cradle tunnels 512 of FIG. 5, and wing tunnel 833A of FIG. 8). Lower lateral portions of the cradle form a set of two first channels 220, while upper portions of each wing clamp 230 form second channels 240. These first and second channels 220 and 240, respectively, together form a set of tubular spaces, or tunnels, which receive the saddle via its mounting rods (see mounting rods 186 of FIG. 1), for slidable engagement. With the dual-adjustment fasteners 235 loosened so that the clamp assembly 205 is in the adjustable position/configuration, the mounting rods can slide forward and backward along the channels 220 & 240, providing the above-mentioned longitudinal adjustment of the saddle. The fasteners 235 provide both longitudinal and rotational adjustment of the attached bicycle seat in the second configuration.

Furthermore, the clamped configuration simultaneously provides a primary clamping action and a secondary clamping action. The primary clamping action fixes the position of the mounting rods, while the secondary clamping action fixes the position of the cradle 210 and wing clamps 230 relative to the central base 260. The cradle 210 and wing clamps 230 rigidly contact the mounting rods via the primary clamping action, while also rigidly contacting the central base 260 via the secondary clamping action. The adjustable configuration simultaneously provides a primary adjustment and a secondary adjustment. The primary adjustment allows sliding of the mounting rods, and while the secondary adjustment allows sliding of the cradle 210 and wing clamps 230 relative to the central base 260. The primary adjustment provides a longitudinal sliding motion of the bicycle seat parallel to its length, while the secondary adjustment provides front to back pivoting of the bicycle seat relative to the seat post, or stanchions 250 & 270. The fasteners 235 are disposed below the sides of the seat and adjustably accessible therefrom. In an exemplary embodiment, the fasteners 235 are further disposed below the mounting rods, each fastener running through a wing clamp 230 and the cradle 210.

Figure 3:
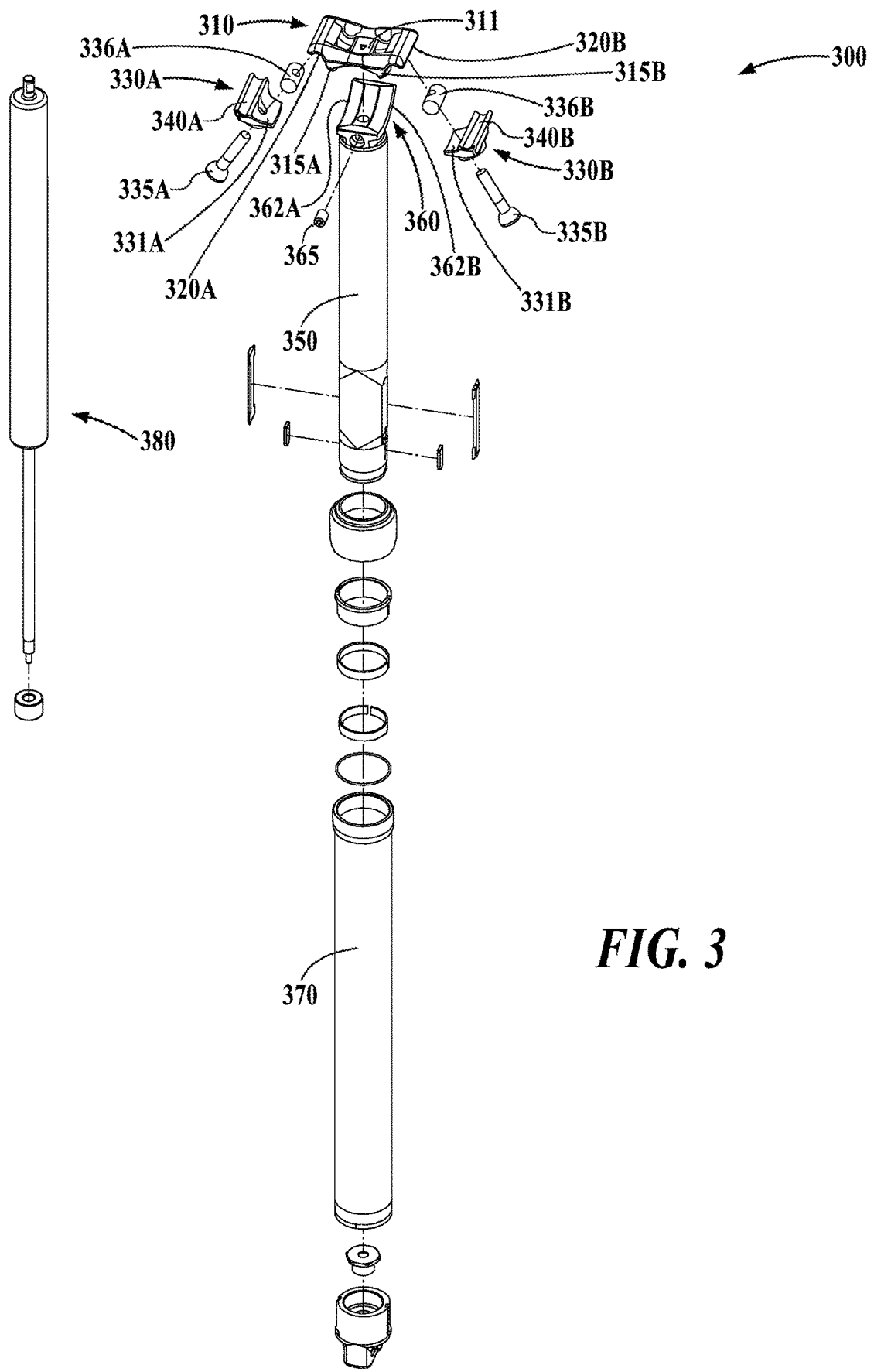
FIG. 3 is an exploded perspective front view of the entire isolated seat post clamp in an embodiment of the presently disclosed invention.

Referring to FIG. 3, an illustration shows an exploded perspective front view of the entire isolated seat post clamp 300 with pump 380. The pump 380, normally found within the seat post clamp 300, is shown to the side of it without lines of explosion, to maximize space in the illustration. The exploded clamp assembly is highlighted in this view, which shows the assembly's individual components in context with the full mechanism. The seat post clamp 300 includes a number of concentrically disposed connective components which integrate with both the upper stanchion 350 and lower stanchion 370, either lying within the two stanchions or serving as cap structures or tightening agents to close off or connect the stanchions, while others provide interior guide structures, similar to a bushing or the like.

The clamp assembly includes the cradle 310, wing clamps 330A and 330B, central base 360, dual-adjustment fasteners 335A and 335B, and a set of two securing elements 336A and 336B. In the mated assembly, the fasteners 335 first pass through the wing clamps 330, then through the cradle 310, and finally through the securing elements 336—which are shown below the cradle 310 for ease of illustration. The cradle 310 further comprises a cavity 311, first channels 320A & 320B, and a set of two cradle guide rails 315A & 315B positioned in a bottom region of the cradle and protruding outwardly from it. In an exemplary embodiment, each fastener 335 is further secured by a securing element 336 on its threaded portion within the cradle cavity 311. The cavity 311 provides a recessed area in a top region of the cradle 310 where the securing elements 336A & 336B can unobtrusively lock into place via the engaged fasteners 335A & 335B. In one example, both securing elements 336 and fasteners 335 have threaded portions for the above engagement. The fully tightened fasteners 335 thus lock the wing clamps 330 and securing elements 336 into place with the cradle 310 lying in-between them, while also forcing portions and surfaces of both the cradle 310 and wing clamps 330 into contact with portions and surfaces of the central base 360, gripping the central base 360 and rigidly mating the clamp assembly into the fixed position. The wing clamps 330 further comprise inner surface concavities 331A & 331B and second channels 340A & 340B. The central base 360 further comprises arched base guide rails 362A & 362B, and cartridge lock nut 365, which is insertable through a depth of the base 360. The cartridge lock nut is used for engaging and disengaging from the oil/air cartridge in the seat post. The cradle 310 and wing clamps 330 are slidably engaged with the arched base guide rails 362 of the central base 360 while the clamp assembly is in the adjustable position. More specifically, the cradle guide rails 315 and wing concavities 331 are simultaneously slidable along the arched base guide rails 362 in the adjustable position of the clamp assembly.

Figure 4:
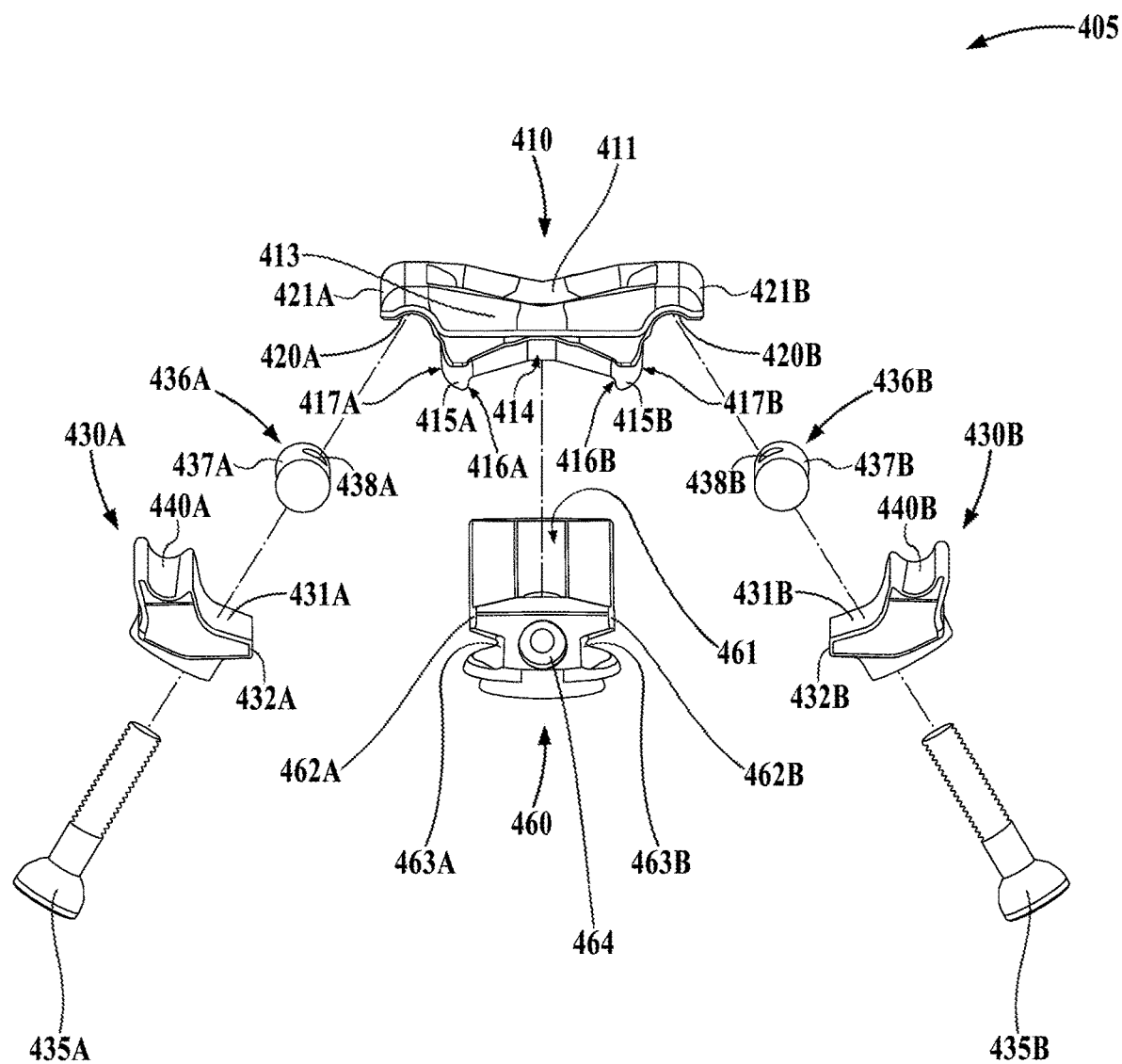
FIG. 4 is an exploded front view of a clamp assembly found at the top of the seat post clamp in an embodiment of the presently disclosed invention.

Referring to FIG. 4, an illustration shows an exploded front view of the clamp assembly 405 found at the top of the seat post clamp 400 depicted in the previous figures. The cradle 410 comprises a body 413 with a top region and an opposing bottom region having a width and length (that being the secondary length of the cradle), the top region including a cavity 411. The bottom region further comprises a set of two guide rails 415A & 415B projecting downward from and extending along the width of the bottom region. The top region has a length and width, and further comprises a set of two lateral projections 421A & 421B protruding outwardly from the top region in opposing directions, each having a proximal and distal end. In an exemplary embodiment, the distance between the terminal distal surfaces of the lateral projections 421 equals the primary length of the cradle 410. The lateral projections 421 extend along the width of the top region. The body 413 further includes a set of two opposing lateral surfaces (see lateral surface 618B of FIG. 6) on the body 413, the distance between the lateral surfaces equaling the secondary length of the cradle in an exemplary embodiment. The lateral surfaces extend along the width and height of the body 413. Each lateral surface is adjacent to a lateral projection 421 and cradle guide rail 415 at its top and bottom respectively. The lateral surfaces and lateral projections 421 meet to form first channels 420A & 420B. The first and second channels 420 and 440, respectively, receive the mounting rods of the saddle for slidable engagement along the channels. Specifically, the second channels 440 of the wing clamps 430 face the first channels 420 of the cradle 410 to form tubular channel tunnels, the mounting rods making slidable contact with both channels while running through these tubular channel tunnels for longitudinal adjustment of the bike saddle while the clamp assembly 405 is in the adjustable position. Additionally, a mating surface 414 lies between the cradle guide rails 415, this mating surface 414 making contact with the central base 460 in the mated clamp assembly 405.

The lateral projections 421 have curved top and bottom surfaces, the first channels 420 coinciding with these curved bottom surfaces. The lateral surfaces further include a set of two outer mating surfaces 417A & 417B of the cradle guide rails 415. As well, the cradle guide rails 415 further comprise a set of two inner guide surfaces 416A & 416B opposing the set of outer mating surfaces 417. In the mated clamp assembly 405, the outer mating surfaces 417 make releasable contact with inner portions of the wing clamps 430, while the inner guide surfaces 416 make slidable contact with the central base 460.

The set of two wing clamps 430A & 430B are shown in greater detail in this view. Each wing clamp 430 has a depth and height. Each wing clamp 430 further includes an inner surface concavity 431A or B which terminates in a guide rail 432A or B at the lower end and a second channel 440A or B at the upper end. The wing clamps 430 also slidably contact the central base 460 via their inner surface concavities 431, thus the wing clamps are dual-function since they also releasably contact the cradle 410. The present invention requires only two such clamps 430 and fasteners 435A & 435B in order to secure the cradle 410 and central base 460 together, eliminating the need for extra connective elements and promoting a more streamlined assembly 405. Securing elements 436A & 436B lie within the cavity 411 of the cradle 410, each further comprising a cylindrical body 437A or 437B with a length and having a tunnel 438A or 438B running therethrough. In an exemplary embodiment, the securing element tunnels 438 are threaded to receive threaded dual-adjustment fasteners 435.

The central base 460 has a width, depth, height, top region and two opposing sides bounding the width. The central base 460 further comprises a base opening 464 and a set of two arched guide rails 462A & 462B projecting laterally away from the sides and extending along the depth and height of the central base 460. The base guide rails 462 form the top portions of base channels 463A & 463B. The base channels 463 receive the wing guide rails 432 for slidable engagement along the base channels. A base mating surface 461 lies between the opposing sides and base guide rails 462 in the top region of the central base 460, providing a slidable contact area for the cradle mating surface 414 of the cradle 410. Both mating surfaces 414 and 461 are shaped to match one another's contours. The distinct contours of each component in the clamp assembly 405 combine to promote a smaller stack height for the installed assembly.

In the mated assembly 405, each securing element 436 is aligned with one cradle tunnel opening (see cradle tunnels 512 of FIG. 5), each securing element having a cylindrical body 437 with length that exceeds any single dimension of its corresponding cradle tunnel opening. Each securing element 436 further comprises a tunnel 438 running through it orthogonal to its length, each tunnel 438 having a diameter, length, and central length axis. In an exemplary embodiment, the cradle tunnels, wing tunnels (see wing tunnel 833A of FIG. 8), securing element tunnels 438, and fasteners 435 are tubular and threaded, the fasteners having a length greater than that of the cradle tunnels, wing tunnels, and securing element tunnels combined.

Figure 5:
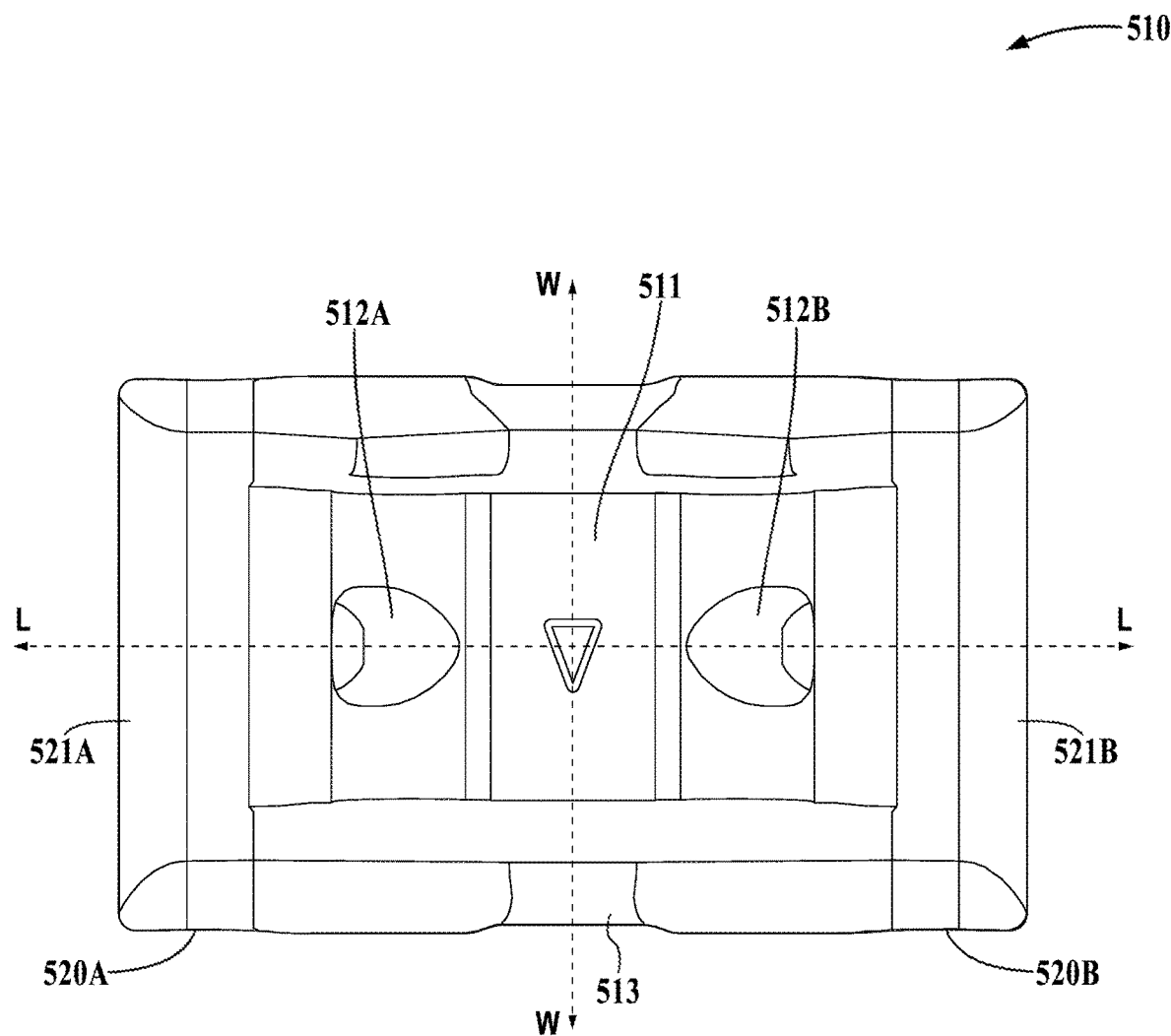
FIG. 5 is a closeup top view of a cradle found in the clamp assembly in an embodiment of the presently disclosed invention.

Referring to FIG. 5, an illustration shows a closeup top view of a cradle 510 found in the clamp assembly. The cradle 510 is shown having a central length axis L-L and central width axis W-W (see FIG. 6 for the cradle's central height axis H-H). The top region of the body 513 of the cradle 510 further comprises a cavity 511 with a length that substantially mirrors that of the bottom region length (or secondary length of the cradle 510), with a percentage of variation between the two lengths that is less than 10% in an exemplary embodiment. In other words, the length of the cavity 511 is within 10% of the bottom region length. Further in such an embodiment, as indicated above, the bottom region length is shorter than the top region length. Within the cavity 511, and running through the body 513, are cradle tunnels 512A & 512B. In an exemplary embodiment, the openings of the cradle tunnels 512 are symmetrically disposed along the top region length, or primary length of the cradle relative to an imaginary plane running parallel to and intersecting both the central height and width axes of the cradle 510 and orthogonally disposed relative to the central height axis of the cradle. The set of two securing elements nest within the cradle cavity 511 and receive the fasteners through the cradle tunnels 512. In one example, the cradle tunnels 512 are threaded to receive the threaded dual-adjustment fasteners. The lateral projections 521A & 521B each have a proximal and distal end, the proximal ends coinciding with the lengthwise boundary surfaces of the cavity 511, the distal ends being the free ends that form the outer portions of the first channels 520A & 520B. The first channels 520 and lateral projections 521 extend along the top region width, while the cradle guide rails (see cradle guide rails 415 of FIG. 4) extend along the bottom region width, these extensions being parallel to the width axis of the cradle 510. In one example, the first channels 520, lateral projections, 521, and cradle guide rails extend along the full stated widths.

Figure 6:
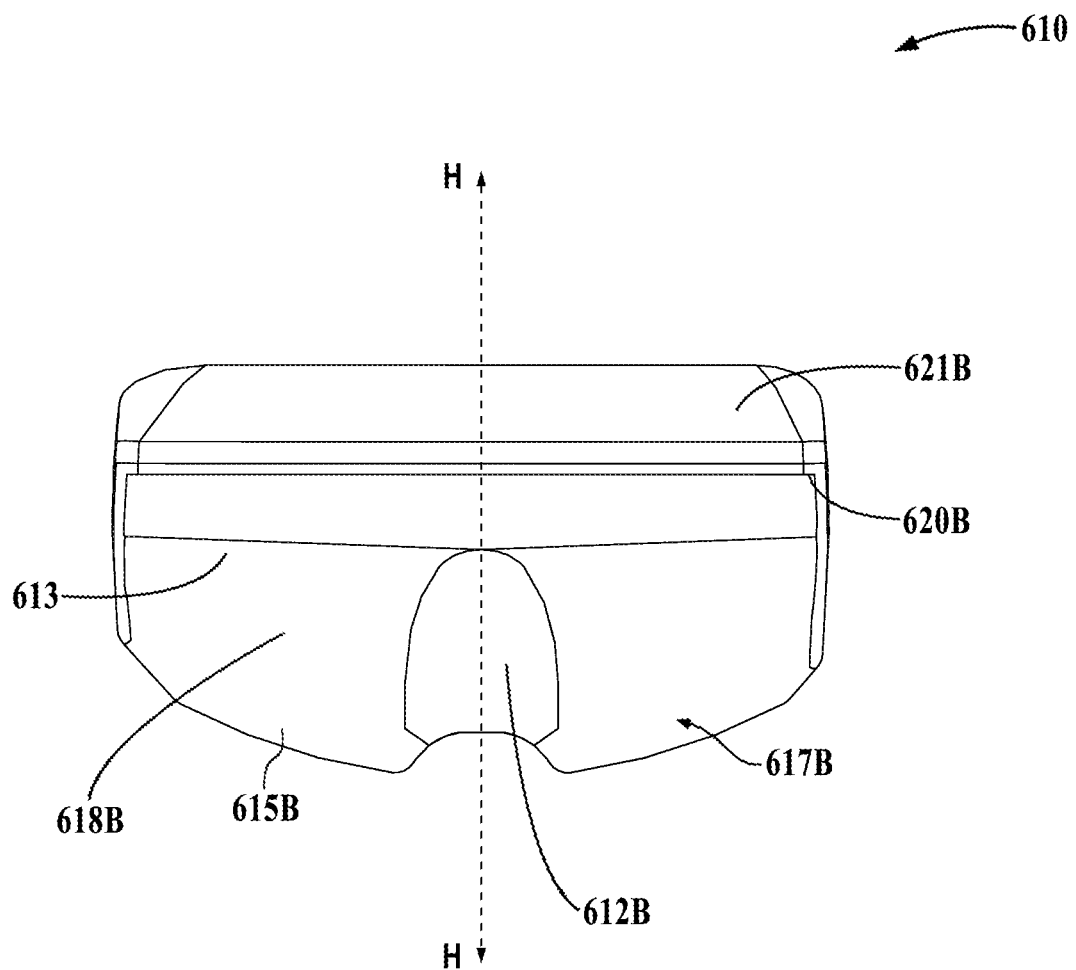
FIG. 6 is a closeup side view of the cradle in an embodiment of the presently disclosed invention.

Referring to FIG. 6, an illustration shows a closeup side view of the cradle 610. The cradle 610 is shown with a central height axis H-H. A lateral surface 618B of the cradle 610 is highlighted. Each lateral surface 618 bounds the cradle body 613, also defining the boundaries of the secondary length of the cradle 610, such that the secondary length terminates in the opposing lateral surfaces 618. The outer mating surfaces 617 (617B in the current view) of the cradle guide rails 615 (615B in the current view) are included on a lower portion of each lateral surface 618. The first channels 620 (620B in this view) are included on an upper portion of each lateral surface 618. The set of two tunnels 612 (612B in the current view) run through the cradle body 613, each tunnel 612 having a length and diameter, an opening in the cavity at one end, and an opening in a lateral surface 618 at the opposing end—as seen in the current view with the lateral opening of cradle tunnel 612B. Each opening of the cradle tunnels 612 lying on a lateral surface 618 is substantially centered relative to the width of the cradle 610. In one embodiment, the tunnels 612 have length axes that intersect at an imaginary point lying above the cradle 610. In the same or other exemplary embodiment, the cradle guide rails 615, lateral projections 621 (621B in the current view), and first channels 620 extend along the full width of the cradle 610, each guide rail 615 having a substantially centered indentation coinciding with a lower portion of the opening of its corresponding cradle tunnel 612. As well, each guide rail 615 is arched from front to back-along the width of the cradle 610, such that it extends furthest away from the cradle near the indentation formed by the opening of its corresponding cradle tunnel 612, and extends least away from the cradle at each end bounding the width of the cradle.

Figure 7:
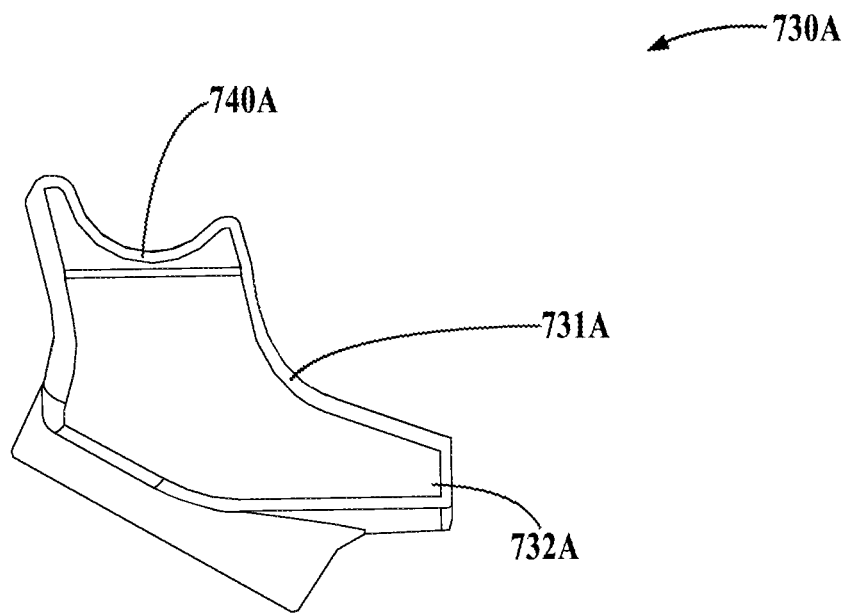
FIG. 7 is a closeup front view of a wing clamp found in the clamp assembly in an embodiment of the presently disclosed invention.

Referring to FIG. 7, an illustration shows a closeup front view of a wing clamp 730A found in the clamp assembly. The arched inner surface concavity 731 (731A in the current view) runs from an edge of each second channel 740 (740A in the current view) to an edge of each wing guide rail 732 (732A in the current view), dominating a substantial portion of the entire height of the wing clamp 730. The wing guide rail 732 exhibits an exemplary vertical thickness that is highly suited for mating with the central base's channels (see central base channels 963 of FIG. 9). In an exemplary embodiment, each wing clamp 730 has no more than one tunnel (see wing tunnel 833A of FIG. 8) running through it to accept a fastener.

Figure 8:
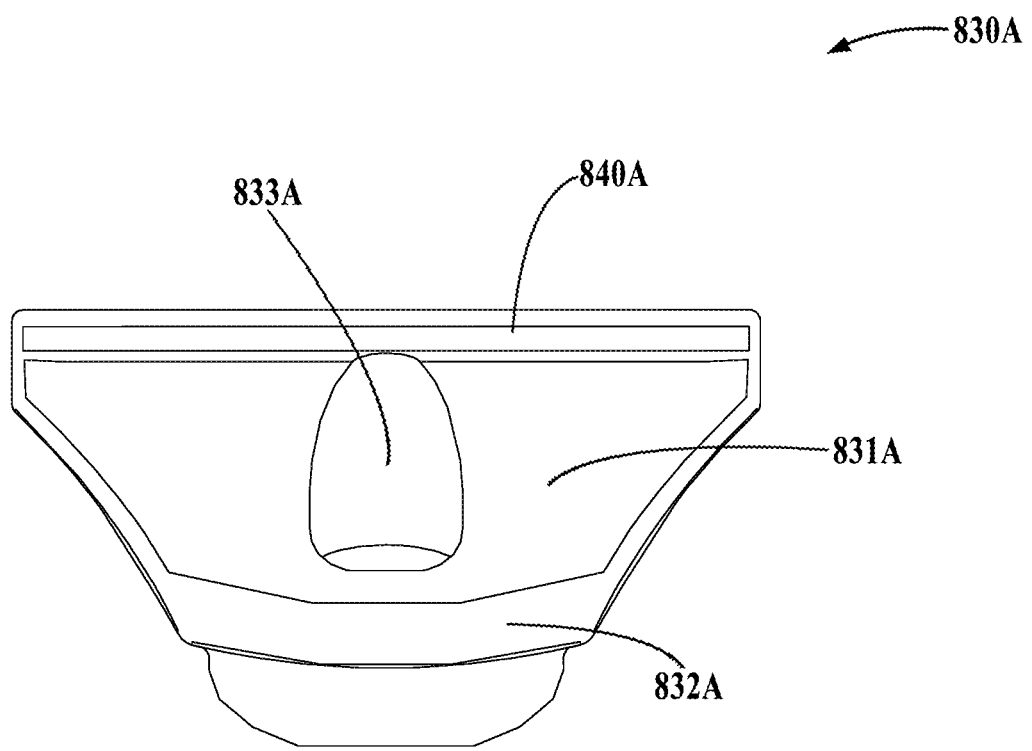
FIG. 8 is a closeup interior side view of a wing clamp in an embodiment of the presently disclosed invention.

Referring to FIG. 8, an illustration shows a closeup interior side view of one wing clamp 830A. Each wing clamp 830 also comprises a tunnel 833 (wing tunnel 833A is shown in this view) running through a portion of its height and having a diameter, length, and central length axis, the wing tunnels 833 and cradle tunnels having a shared length axis when the clamp assembly is releasably mated, with the lengths of the dual-adjustment fasteners running through both the wing and cradle tunnels' full lengths and also sharing the above-mentioned length axis. Each wing tunnel 833 opens at one end into its inner surface concavity 831 (831A in the current view), substantially centered along the depth of the wing clamp 830. This opening occupies most of the height-wise arch of the concavity 831 up to the second channel (840A in the current view) and down to the wing guide rail 832 (832A in the current view). In an exemplary embodiment, each second channel 840 extends along the full depth of its wing clamp 830. In one example, the depth of each second channel 840 is approximately double that of the wing guide rail 832. Considering the mated clamp assembly, the inner surface concavities 831 of the wing clamps 830 contact the outer surfaces of the cradle guide rails and the central base guide rails and channels. The inner surfaces of the cradle guide rails contact the central base guide rails.

Figure 9:
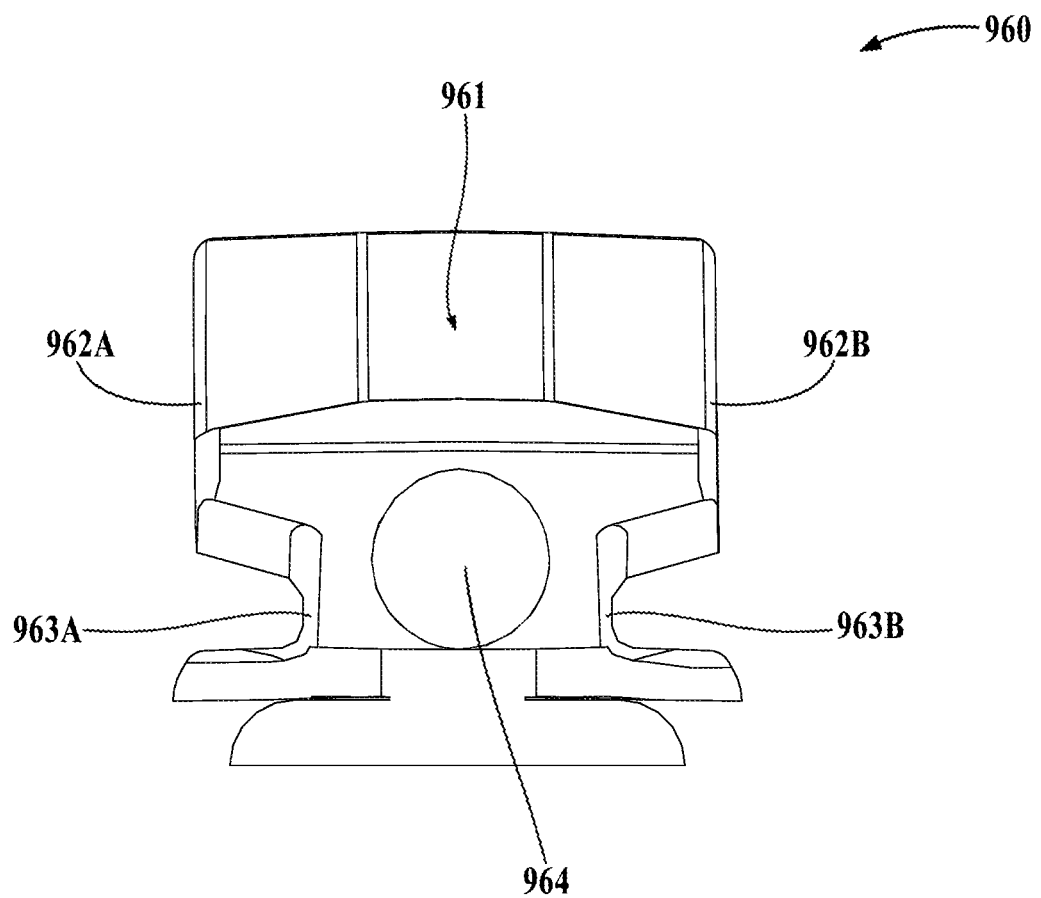
FIG. 9 is a closeup front view of a central base found in the clamp assembly in an embodiment of the presently disclosed invention.

Referring to FIG. 9, an illustration shows a closeup front view of a central base 960 found in the clamp assembly. In the mated assembly, the inner surface concavities of the wing clamps slidably contact the base guide rails 962A & 962B while releasably contacting the outer mating surfaces of the cradle guide rails. At the same time, the inner guide surfaces of the cradle guide rails also slidably contact the base guide rails 962. This simultaneous contact underscores an essential structural advantage to the present invention, whereby a plurality of smaller structures in the assembly form slidable or releasable grips in a smaller space, streamlining the assembly and forming a smaller stack height for it, using fewer components. Base channels 963A & 963B have an exemplary height which makes them highly suited for slidable contact with the wing guide rails. Referring to the top region of the central base 960, an upper portion of the arched base mating surface 961, which has a depth, is shown in this view extending above the front ends of the base guide rails 962. The base opening 964 is positioned centrally with respect to the base channels 963 which flank it. In one example, the base opening 964 provides a cylindrical threaded tunnel which accepts the cartridge lock nut (see cartridge lock nut 365 of FIG. 3).

Figure 10:
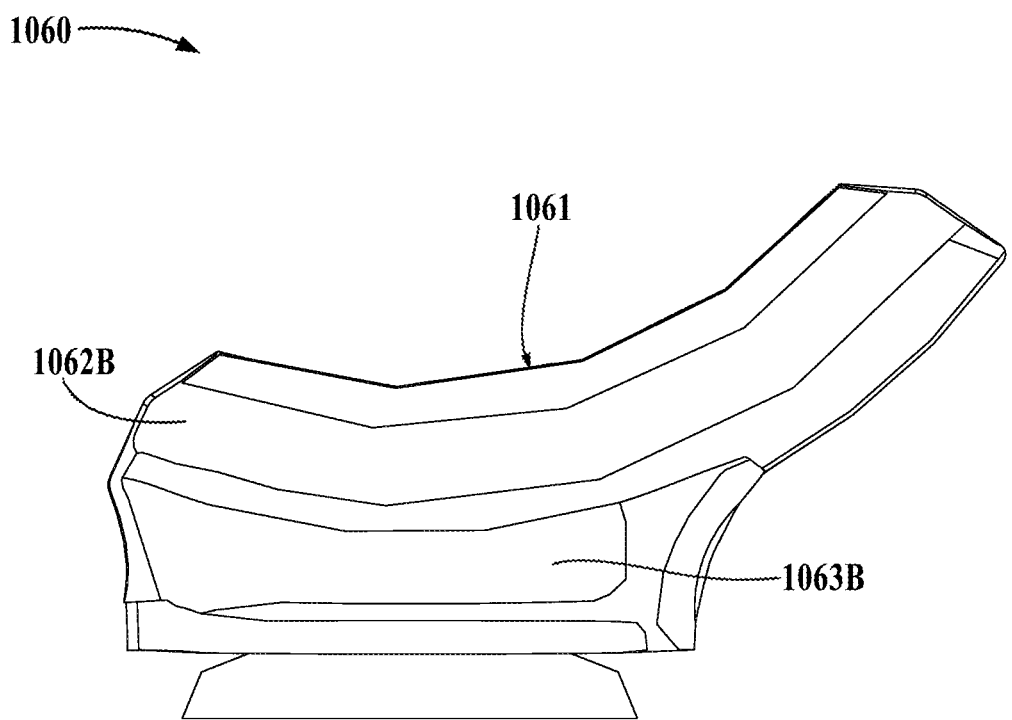
FIG. 10 is a closeup side view of the central base in an embodiment of the presently disclosed invention.

Referring to FIG. 10, an illustration shows a closeup side view of the central base 1060. Each opposing side further comprises an arched guide rail 1062 (1062B in the current view), the arched guide rails having a depth and protruding outwardly from the sides and forming top portions of channels 1063 (1063B in the current view), the channels having a depth as well. The central base guide rails 1062 are depth-wise arched progressively higher from front to back, such that sliding the cradle and wing clamps along the central base channels 1063 results in substantial vertical pivoting of the front and back ends of the bicycle seat for its rotational adjustment while the clamp assembly is in the adjustable position. In the present embodiment, the central base mating surface 1061 runs nearly the entire depth of the central base 1060, extending from front to back similarly to the central base guide rails 1062, extending some distance upward along the central base's height as well and extending past the full depth of the central base channels 1063 a distance along with the central base guide rails 1062. Thus the full depths of the central base mating surface 1061 and central base guide rails 1062 are each greater than that of the central base channels 1063. This allows for ample longitudinal adjustment space as the contacted cradle mating surface slides back and forth along the central base mating surface 1061.

Many variations may be made to the embodiments described herein. All variations are intended to be included within the scope of this disclosure. The description of the embodiments herein can be practiced in many ways. Any terminology used herein should not be construed as restricting the features or aspects of the disclosed subject matter. The scope should instead be construed in accordance with the appended claims.

There may be many other ways to implement the disclosed embodiments. Various functions and elements described herein may be partitioned differently from those shown without departing from the scope of the disclosed embodiments. Various modifications to these implementations may be readily apparent to those skilled in the art, and generic principles defined herein may be applied to other implementations. Thus, many changes and modifications may be made to the disclosed embodiments, by one having ordinary skill in the art, without departing from the scope of the disclosed embodiments. For instance, different numbers of a given element or module may be employed, a different type or types of a given element or module may be employed, a given element or module may be added, or a given element or module may be omitted.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

The invention claimed is:

1. A seat post clamp for securing a bicycle seat to a bicycle frame, the seat post clamp comprising a clamp assembly, the clamp assembly further comprising:
   (a) a cradle having central length, width, and height axes and further comprising a top region, a body, and a bottom region;
      i. the top region having a length and width, and further comprising lateral projections, the lateral projections protruding outwardly from the top region in opposing directions;
      ii. the body further comprising two opposing lateral surfaces;
      iii. the bottom region having a length and width, and further comprising guide rails, the guide rails protruding outwardly from the bottom region;
      wherein the bottom region length is shorter than the top region length, wherein the lateral projections and cradle guide rails extend along the cradle parallel to its width axis, wherein the lateral surfaces and lateral projections meet to form first channels, wherein a mating surface lies between the cradle guide rails;

(b) a set of two wing clamps, each wing clamp having a depth and height, and comprising an inner surface concavity;
  i. each inner surface concavity terminating in a guide rail at a lower end and a second channel at an upper end;
(c) a central base having a depth, width and height, and comprising a top region and two opposing sides;
  i. the top region further comprising a mating surface with a depth;
  ii. each side further comprising an arched guide rail, the arched guide rails having a depth and protruding outwardly from the sides and forming top portions of channels, the channels having a depth;
    wherein the central base mating surface lies between the opposing sides;
(d) a set of two fasteners, each fastener having a length, a central length axis, and a thickness running orthogonal to the length; and wherein each wing clamp comprises a single tunnel running through it to accept a respective one of the set of two fasteners, the wing clamps each having no more than one tunnel or other through hole for accepting fasteners
  wherein the cradle and wing clamps are configured to accept the fasteners and releasably mate therewith, this mating simultaneously engaging the cradle and wing clamps with the central base, each wing clamp simultaneously flanking a lateral surface of the cradle and an arched guide rail of the central base, their inner surface concavities facing each other, each wing clamp further being the mirror image of the other and symmetrically disposed relative to an imaginary plane running parallel to and intersecting both the central height and width axes of the cradle, wherein the mated cradle and wing clamps are configurable into fixed and adjustable positions relative to the central base and each other, wherein the cradle, wing clamps, and central base are rigidly fixed together in the fixed position, and wherein the cradle and wing clamps are slidably engaged with the central base and loosely engaged with each other in the adjustable position.

2. The seat post clamp of claim 1, wherein the bicycle seat has a length terminating in front and back ends, and further comprises an underside with a set of mounting rods running parallel to the seat length, wherein the first and second channels are configured to slidably engage with the mounting rods, and wherein the central base channels are configured to slidably engage with the wing guide rails.

3. The seat post clamp of claim 2, wherein the lateral projections have curved top and bottom surfaces, the first channels coinciding with these curved bottom surfaces, wherein the cradle lateral surfaces further include a set of two outer mating surfaces of the cradle guide rails, wherein the cradle guide rails further comprise a set of two inner guide surfaces opposing the set of outer mating surfaces, wherein the second channels of the wing clamps face the first channels of the cradle to form tubular channel tunnels, the mounting rods making slidable contact with both channels while running through said channel tunnels for longitudinal adjustment of the bicycle seat while the clamp assembly is in the adjustable position, and wherein the central base guide rails are depth-wise arched progressively higher from front to back, such that sliding the cradle and wing clamps along the central base channels results in vertical pivoting of the front and back ends of the bicycle seat for its rotational adjustment while the clamp assembly is in the adjustable position.

4. The seat post clamp of claim 3, wherein the cradle mating surface slidably contacts the central base mating surface, wherein the inner surface concavities of the wing clamps slidably contact the central base guide rails while releasably contacting the outer mating surfaces of the cradle guide rails, and wherein the inner guide surfaces of the cradle guide rails also slidably contact the central base guide rails.

5. The seat post clamp of claim 4, wherein the top region of the cradle further comprises a cavity with a length that is within 10% of the bottom region length, wherein the lateral projections each have a proximal and distal end, and wherein said proximal ends coincide with lengthwise boundary surfaces of the cavity.

6. The seat post clamp of claim 5, wherein the lateral projections and first channels extend along the full top region width, wherein the cradle guide rails extend along the full bottom region width, wherein the second channels extend along the full depths of the wing clamps, and wherein the full depths of the central base mating surface and central base guide rails are each greater than that of the central base channels.

7. The seat post clamp of claim 4, wherein the cradle further comprises a set of two tunnels running through its body, each tunnel having a length, a diameter, an opening in the cavity at one end and an opening in a lateral surface at the opposing end, the tunnels further having length axes that intersect at an imaginary point lying above the cradle, and wherein each wing clamp also comprises a tunnel with a length, diameter, and length axis, the wing tunnels and cradle tunnels having a shared length axis when the clamp assembly is releasably mated, the lengths of the fasteners running through both the wing and cradle tunnels and also sharing said length axis.

8. The seat post clamp of claim 7, wherein the cradle tunnel openings in the cavity are symmetrically disposed along the cradle's top region length relative to an imaginary plane running parallel to and intersecting both the central height and width axes of the cradle, and wherein the clamp assembly further comprises a set of two securing elements configured to nest within the cradle cavity and receive the fasteners through the cradle tunnels.

9. The seat post clamp of claim 8, wherein each securing element is aligned with one cradle tunnel opening, each securing element having a cylindrical body with length that exceeds any single dimension of its corresponding cradle tunnel opening, wherein each securing element further comprises a tunnel running through it orthogonal to its length, each tunnel having a diameter, length, and central length axis, and wherein the cradle tunnels, wing tunnels, securing element tunnels, and fasteners are tubular and threaded, the fasteners having a length greater than that of the cradle tunnels, wing tunnels, and securing element tunnels combined.

* * * * *